United States Patent [19]
Gan et al.

[11] Patent Number: 5,751,610
[45] Date of Patent: May 12, 1998

[54] ON-LINE ROBOT WORK-CELL CALIBRATION

[75] Inventors: Zhongxue Gan, Storrs, Conn.; Lance Terrance Fitzgibbons, Southwick, Mass.; Qing Tang, Wethersfield; Jeffrey Sherman Katz, West Hartford, both of Conn.

[73] Assignee: Combustion Engineering, Inc., Windsor, Conn.

[21] Appl. No.: 741,898

[22] Filed: Oct. 31, 1996

[51] Int. Cl.[6] .................................................. G01C 25/00
[52] U.S. Cl. .................... 364/571.03; 364/170; 901/9; 901/23; 73/866.5; 324/220; 318/568.11
[58] Field of Search ............................. 364/571.03, 190; 395/94; 376/260, 245, 249, 248; 414/4, 1; 901/9, 23; 73/623, 866.5; 324/220; 318/568.11

[56] References Cited

U.S. PATENT DOCUMENTS

| | | | |
|---|---|---|---|
| 4,168,782 | 9/1979 | Sturges, Jr. .................................. | 414/4 |
| 4,261,094 | 4/1981 | Gerkey et al. .............................. | 29/427 |
| 4,891,767 | 1/1990 | Rzasa et al. ................................ | 395/94 |
| 5,037,215 | 8/1991 | Crick .......................................... | 400/118 |
| 5,265,129 | 11/1993 | Brooks et al. ............................. | 376/248 |

*Primary Examiner*—James P. Trammell
*Assistant Examiner*—Hien Vo
*Attorney, Agent, or Firm*—John H. Mulholland; L. James Ristas

[57] ABSTRACT

The work cell is divided into a plurality of calibration zones, and calibration is made with only one measured point in each zone. The calibration zones are set up such that the calibration error in each zone remains within an acceptable tolerance. Within each zone, calibration is preferably made according to a linear calibration algorithm. The method according to the invention includes the steps of storing a first database, of the coordinates of all the tube openings in the tube sheet coordinate system. Each coordinate of the first database is assigned to one of a plurality of calibration zones.

13 Claims, 11 Drawing Sheets

ON-LINE ROBOT WORK-CELL CALIBRATION

BACKGROUND OF THE INVENTION

The present invention relates to the remote inspection and servicing of heat exchangers, and particularly, the tubes in a nuclear steam generator.

Nuclear steam generators are huge heat exchangers in which tens of thousands of elongated tubes are secured at their open ends, to a thick, rigid tube sheet, at the lower head of the steam generator. Primary system water which has been heated in the nuclear reactor, is pumped into the lower head for passage through the tubes and return to the reactor. Secondary system water is supplied outside the tubes, for absorbing heat from the tubes to the extent that a phase change occurs, thereby producing steam for delivery to the turbine/generators.

Because the primary water passing through the tubes has a relatively high level of radioactivity as compared with the secondary water, and the secondary water is more likely to leak or be discharged from the plant, great care is taken to assure that primary water does not leak into the secondary water. One source of potential leakage is corrosion or other degradation of the steam generator tubes. Accordingly, during planned refuelling outages, a program of steam generator tube inspection and servicing is undertaken. Access to the tubes is through the tube openings at the tube sheet.

Over the years, the inspection and servicing techniques have evolved from the use of a team of human "jumpers", who would take turns to enter the steam generator head and perform the inspection and servicing for a brief period so as not to exceed radiation exposure limits, to the current use of robotic devices. These devices are temporarily attached to the tube sheet or adjacent structure, and carry an end effector which can perform inspection and/or servicing operations. The robot and end effector are controlled remotely, i.e., from outside the steam generator head.

Because the window of opportunity for steam generator tube inspection and servicing is limited not only by the plant outage, but also by the fact that other service may be required for the steam generator, it is becoming more and more important to reduce the time necessary for performing the inspection and servicing, and conversely to maximize the number of tubes which can be inspected and serviced during a particular outage. Ideally, the robot could be preprogrammed to inspect and/or service a predetermined number of specified tubes, on a continual schedule without interruption. This degree of automation is not possible, however, due to both practical and regulatory considerations. The robot is relatively bulky as compared with the size and spacing of the openings. With tens of thousands of openings, and a need for the inspection or servicing tool to register substantially exactly on the center line of the targeted opening, it is impossible with only a single calibration of the robot, to move the end effector over a large area of the tube sheet, and align the end effector with any one or more specified openings. As a consequence, the robot must be recalibrated frequently. Also, by observing the end effector in a camera, the operator frequently intervenes with a joy stick to toggle the end effector into registry with the targeted tube opening. Under regulatory procedures, independent confirmation must be achieved, that the end effector is in fact registered with the target opening. The inspection servicing step cannot be initiated, until such confirmation is obtained.

Given that the tube sheet presents tens of thousands of openings in a two dimensional pattern which is highly regular (except at the periphery and near structural features), both the main positioning technique and the position confirmation technique, require complex processing and are therefore sluggish.

SUMMARY OF THE INVENTION

A system has been developed for improving the performance of robots used for the inspection and servicing of steam generators or other equipment having a fixed array of tube openings, and furthermore, an improvement has been made in the technology of tracking moving objects, which is applicable for other end uses as well.

According to the present invention, the work cell is divided into a plurality of calibration zones, and calibration is made with only one measured point in each zone. The calibration zones are set up such that the calibration error in each zone remains within an acceptable tolerance. Within each zone, calibration is preferably made according to a linear calibration algorithm.

The method according to the invention includes the steps of storing a first database, of the coordinates of all the tube openings in the tube sheet coordinate system. Each coordinate of the first database is assigned to one of a plurality of calibration zones. From measurements taken at a single tube opening in each of a plurality of calibration zones, the errors due to environmental irregularities and robot translation and rotation errors are converted into an equivalent robot coordinate offset which is unique to and remains constant within each calibration zone.

In particular, the position of the end effector in the tube sheet coordinate system is determined. The coordinate in the tube sheet coordinate system is selected of a first target tube opening, to which the end effector will be repositioned by articulation of the arm. The arm is moved automatically to reposition the end effector at the selected tube end according to a robot kinematics equation which quantitatively relates the tube sheet coordinate system to the robot coordinate system. A determination is made whether the end effector as repositioned is deviated from direct registry with the target tube opening. If a deviation is determined, the arm is toggled to differentially move the end effector until the deviation is reduced within an acceptable tolerance. The differential movement of the toggled end effector is recorded. The coordinate of a second target tube in the same calibration zone as the first target tube is then selected. The arm is automatically moved to reposition the end effector at the second selected tube end according to a recalibrated robot kinematics equation which quantitatively relates the tube sheet coordinate system to the robot coordinate system as further offset by the recorded differential movement.

BRIEF DESCRIPTION OF THE DRAWINGS

These and other objects and advantages of the invention will be evident from the description set forth below with reference to the accompanying drawings wherein.

DESCRIPTION OF THE PREFERRED EMBODIMENT

I. System Environment

A. Tube Sheet and Robot

Figure 1:
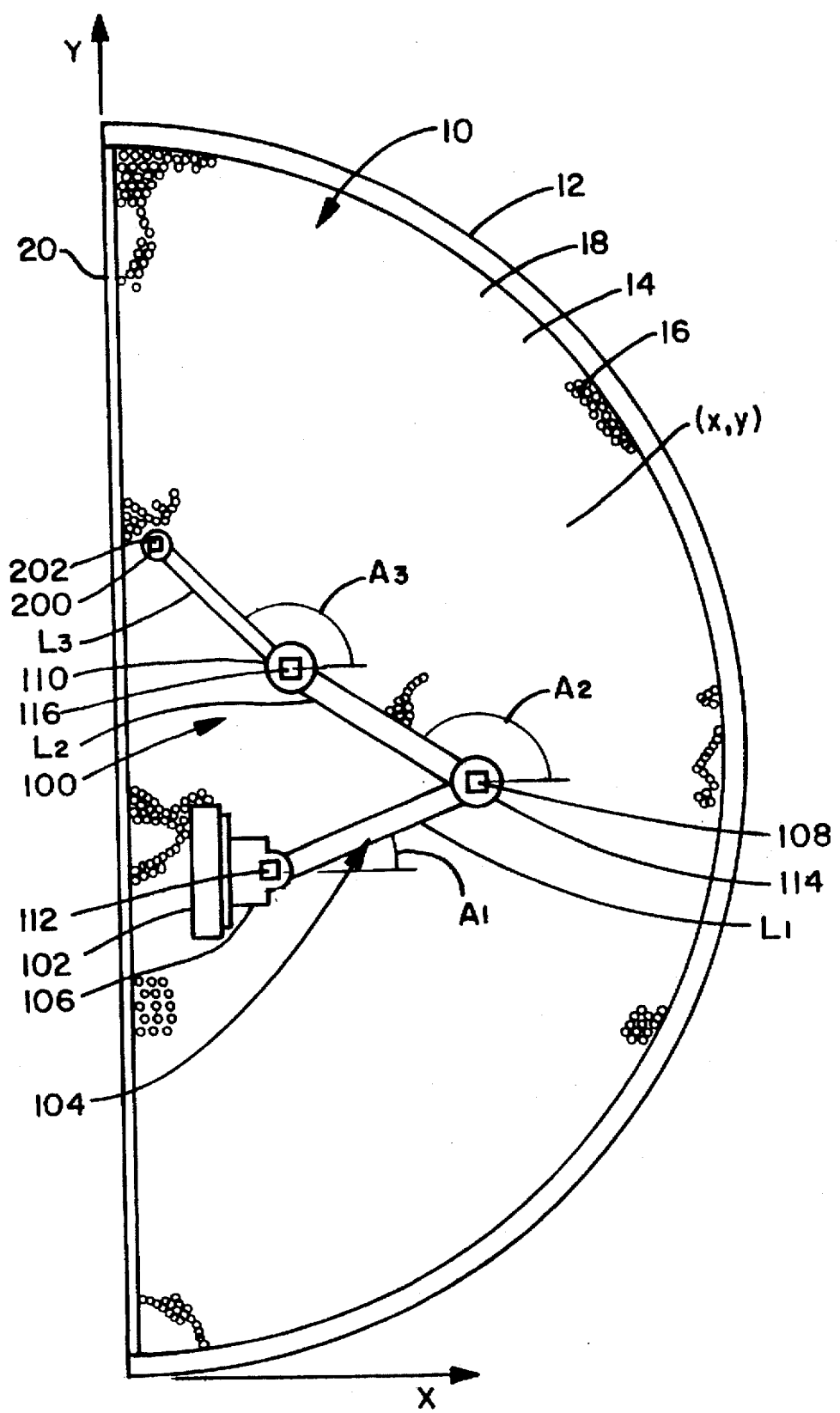
FIG. 1 is a schematic of one half of the exposed surface of a tube sheet, and a robot secured thereto for servicing the tubes.

FIG. 1 is a schematic of a semi-circular portion, i.e., one half, of the surface of a tube sheet 10 in the lower head of a nuclear steam generator 12, with the observer looking upwardly from the bottom of the tube sheet, where the tube ends 14 are secured to, and appear as openings 16 in, the tube sheet. The tens of thousands of such tubes and openings are typically all circular and concentric, with known nominal diameters. The centers of the openings 16 lie on a matrix, which can define either a rectangular, hexagonal, or other repeating pattern, in which the distance between neighboring openings, is known on the average, with a high degree of precision. Nevertheless, as a result of manufacturing tolerances, especially near at the perimeter 18 and near structural members 20 of the tube sheet and/or steam generator, the next neighbor spacing could deviate slightly from the nominal.

For convenience, the matrix of the centers of the openings, can be located by a tube sheet coordinate system, having, for example, an X axis establishing row coordinates and an orthogonal Y axis, thereby establishing a unique position (x, y) at the planar surface of the tube sheet.

FIG. 1 also shows a robot 100 having a base 102 in fixed position relative to the tube sheet 10, resulting, for example, by securing the robot against structural components (not shown) of the tube sheet in the head, or by expanding a plurality of fingers (not shown) projecting from the robot, into a plurality of the tube ends in the tube sheet. The robot 100 has an articulated arm 104, including a shoulder joint 106, an elbow joint 108, and a wrist joint 110, each of which rotates about a respective axis perpendicular to the tube sheet 10. The shoulder axis 112 is stationary, whereas the elbow and wrist axes 114, 116 are displaceable along the X, Y plane, as the link segments of the arm articulate. The link segments L1, L2, and L3, are shown respectively forming initial joint angles as A1, A2 and A3. An end effector 200 is carried at the free end of the wrist link L3. The end effector 200 carries at least one tool 202 which, upon positioning at a particular location (x, y) determined by the robot joints, can be actuated to move perpendicularly toward the tube sheet, for insertion into an opening therein. For convenience, the direction of movement into the tube sheet, will be referred to as movement in the Z direction.

The articulation of the robot arm 104 permits the operator outside the steam generator, to remotely reach at least 95% of the openings 16 in one semi-circular tube sheet section as shown in FIG. 1, from a single robot mounting in that section. The tool or tools 202 on the end effector 200 can inspect, plug or repair, hundreds of tubes during a given plant refueling outage. It should be appreciated that the end effector can have other components mounted in fixed relation to the tool, whereby the position of the tool also specifies the position of the other components on the end effector, and vice versa.

B. Frames of Reference and Position Specification

Figure 2:
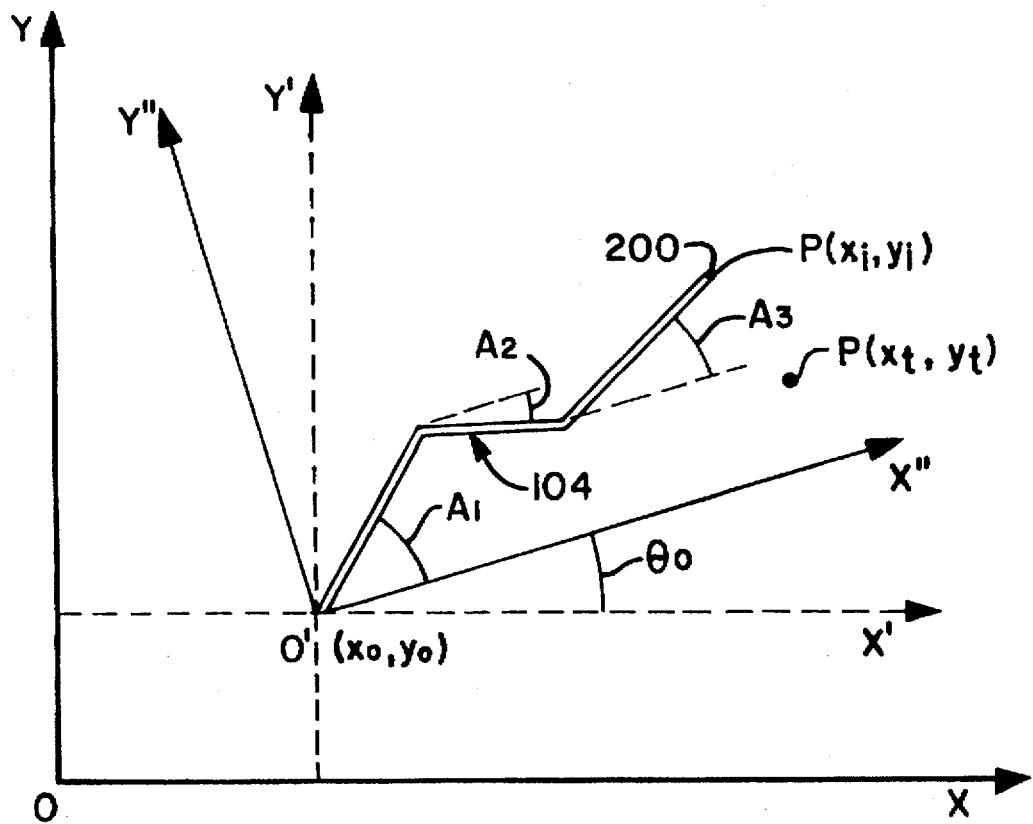
FIG. 2 is a graphical representation of the coordinate systems for specifying the locations of openings in the tube sheet and the positions of the robot end effector.

FIG. 2 provides additional graphic representations of the coordinate systems utilized in specifying the position of the end effector 200 or tool 202 thereon, as well as the variables used in the execution of the algorithm which controls the articulation of the robot arm 104. The tube sheet coordinate system can be represented by X-O-Y. The ideal robot coordinate system can be viewed as superimposed on the tube sheet coordinate system, in having its own origin O' at $(x_o, y_o)$ and associated axes X', Y', which are respectively parallel to, but merely shifted as an offset from, the origin and axes of the tube sheet coordinate system. The robot shoulder 102 is fixed at origin O', but the base could be slightly misaligned, by an offset angle $\phi_o$. The resulting shifted and rotated axes, are shown at X"-O"-Y" (wherein O" and O" are identical). This is the actual robot coordinate system.

The robot arm of FIG. 1 is shown in FIG. 2. If it is assumed that the tool 202 on the end effector 200 is cylindrical with a slightly lesser diameter than that of a round opening 16 in the tube sheet, and that the position of the tool center line is known to be $(x_i, y_i)$ in the tube sheet coordinate system (e.g., because the tool is being withdrawn from an opening which has a position reference marker), a fundamental operational objective of the robot, is to remotely displace the end effector by planar movement of the robot arm, so that the tool center line coaxially aligns with a target opening centered at $(x_r, y_r)$, of the tube sheet coordinate system.

C. Problems

Whereas the robot can be commanded to reach the target position $(x_r, y_r)$, exact registration of the tool 202 with the target opening 16, does not routinely occur. When the tool center line is aligned within an acceptable tolerance, with the center of the target opening, the tool may be considered as being in registry with the opening. The tolerance depends on how closely alignment must be achieved, for the tool to insert fully when actuated in the Z direction. The tool actuation typically occurs by an actuating mechanism at the end effector, not by Z movement of the robot arm.

The target position $(x_r, y_r)$ is selected by the operator, with respect to the tube sheet coordinate system. The robot intelligence processor must compare the target position with the initial (current) position $(x_i, y_i)$ of the end effector, and determine which particular angular movements of the shoulder 106, elbow 108 and wrist 110, will efficiently reposition the end effector 200 so the tool 202 registers with the target opening at ($x_t$, $y_t$). For a variety of reasons, the control algorithm for the robot must be calibrated. The more precise the calibration, the more automated the robot movement, i.e., the requirement for operator intervention to achieve registry, is minimized. Moreover, as noted above, positioning must be confirmed. In any event, even if positioning is improved and confirmed, the need for fine adjustment to achieve registry will arise frequently, and it would represent a significant improvement to current technology, if such fine adjustment could be made automatically, rather than requiring direct operator intervention.

D. Innovations Overview

Figure 3:
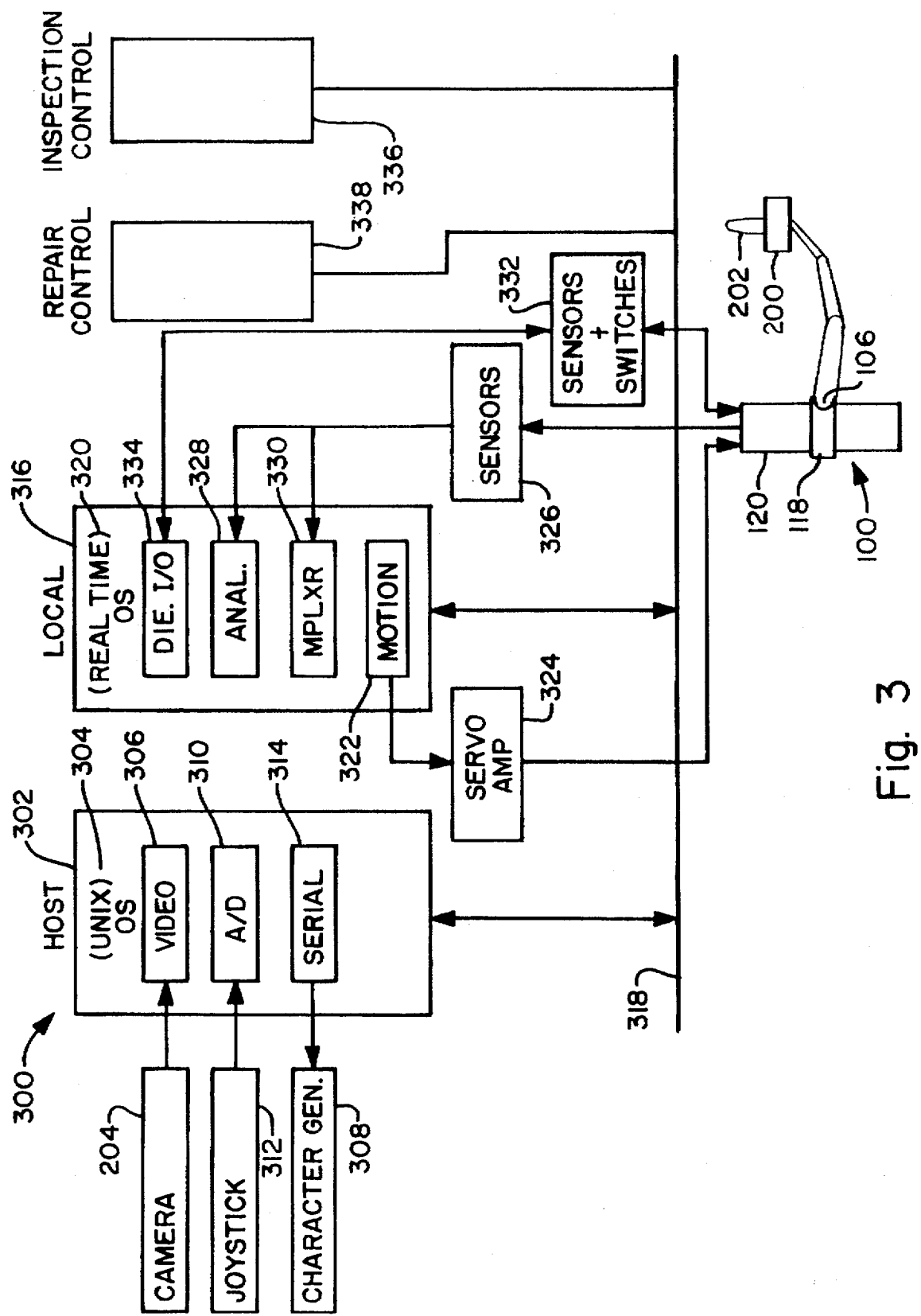
FIG. 3 is a schematic overview of the preferred robot control system for implementing the present invention.

FIG. 3 presents a schematic overview of the preferred robot control system 300. The system 300 embodies several inventions which are preferably used in combination, but which can be used independently of each other. One of the inventions provides on-line robot calibration. The second invention provides dynamic position control, so that the fine adjustment to achieve registry of the tool with the opening, can be achieved automatically. A third invention improves the gross movement to, or confirmation of, position, by tracking the movement of objects in a scene of a video camera.

The robot 100 in FIG. 3 is shown with the shoulder joint 106 supported in a collar 118 attached to a support post 120 carried by the base 102 (see FIG. 1). The support post 120 provides conduits and the like, for cabling associated with servo motors, sensors, hydraulic pistons or pumps, cameras, and other components and devices forming a part of the robot, or carried on the end effector, in a manner to be described more fully below.

A work station 302 or host computer, includes conventional digital processing capability implemented with an operating system 304, preferably Unix. The work station includes a video board 306, which is associated with a camera 204 carried at the end effector 200 or otherwise situated within the steam generator head. The work station also includes a monitor 308 by which the operator can view the image of a scene in the field of view of the camera. The work station further includes an analog to digital conversion board 310, such that the continuous movements on a joy stick 312 in the hand of an operator, can be converted into digital output signals in a coordinate system recognized by the robot controller. A serial link 314 is also provided in the work station, for receiving input from the local controller 316 on the robot 100 and displaying characters to the operator through the monitor, indicative of data or conditions, such as position coordinates, as stored in the controller.

The work station 302 is connected to the remainder of the system 300 via an Ethernet network or bus 318. The local controller 316 associated with the robot, typically has a real time operating system 320 associated with the local central processing unit. The controller 316 includes a motion control output module 322 which delivers a signal to a servo amplifier 324, which in turn provides the control signals for the articulation of the joints and the actuation of mechanisms on the end effector. Various sensors and switches at the robot, either provide sensor signals 326 to the analogue input boards 328 and multiplexers 330 in the local controller, or operate interactively via 332 with the digital input output board 334 on the local controller.

The end effector 200 will typically first be fitted with an eddy current probe tool 202, for insertion into openings and inspection of the associated tubes. In some instances, a given end effector with probe 202 will be utilized to inspect all of the tubes specified for inspection during a given outage. After the results of the inspection have been analyzed, and the tubes identified for servicing, the inspection tool is replaced with a plugging or sleeving tool, with its associated controller. Neither the eddy current tool nor the plugging or sleeving tool and associated controllers 336, 338 form any part of the present invention. The structure and remote operation of such tools, are well known in the art.

II. On-Line Robot Calibration

Robot position calibration is essential to ensure that the robot performs accurately. There are basically two types of calibrations, robot calibration and work cell calibration. The purpose of robot calibration is to compensate for the robot's own variations in geometric parameters. The purpose of work cell calibration is to ensure that the coordinate relationship between the robot and the working environment, is correct. These calibrations are used to adjust the robot parameters and work cell parameters to accurately position the robot end effector. For present purposes, the term "work cell" means the entire portion of the tube sheet which can be accessed by the robot from a fixed origin, i.e., the semi-circular region 10 shown in FIG. 1, and the robot itself. With reference also to FIG. 2, the robot must be calibrated at its origin O' relative to the tube sheet origin O, such that the final position P(x, y) of the end effector in the robot coordinate system, coincides with the desired target ($x_t$, $y_t$) in the tube sheet coordinate system.

According to the on-line calibration invention, a unique work cell calibration technique is provided, to determine the equivalent offsets ($x_o'$, $y_o'$) to compensate for all environmental errors, on the assumption that the robot link lengths L1, L2 and L3, and the initial joint angles A1, A2 and A3 are calibrated and accurately known. It can be understood that if the rotation offset $\phi_o = 0$, the equivalent offsets could be expressed as ($x''_o$, $y''_o$).

Currently known work cell calibration is based on an off-line least squares method. This method provides an optimal fit to the measured points, and gives an approximation of the robot kinematics parameters and work cell parameters. However, it has several deficiencies. It is very time consuming, because it needs measurements from multiple points. At least six points are needed to be measured to calibrate the parameters for the position correction in the coordinate of the working environment. It also assumes that the tube sheet openings on the coordinate matrix, all have perfect pitch. But, as indicated above, portions of the tube sheet may have openings that are shifted or offset from their theoretically designed positions. This effect is included within what are deemed environment errors. Furthermore, geometric errors result from unavoidable robot deformation, i.e., the robot arm droops under certain loads; this cannot be readily compensated for with current calibration algorithms.

After investigation of robots operating in nuclear steam generators, the inventors have found that the dominant geometric error is a systematic geometric error, not a random noise error.

Figure 4:
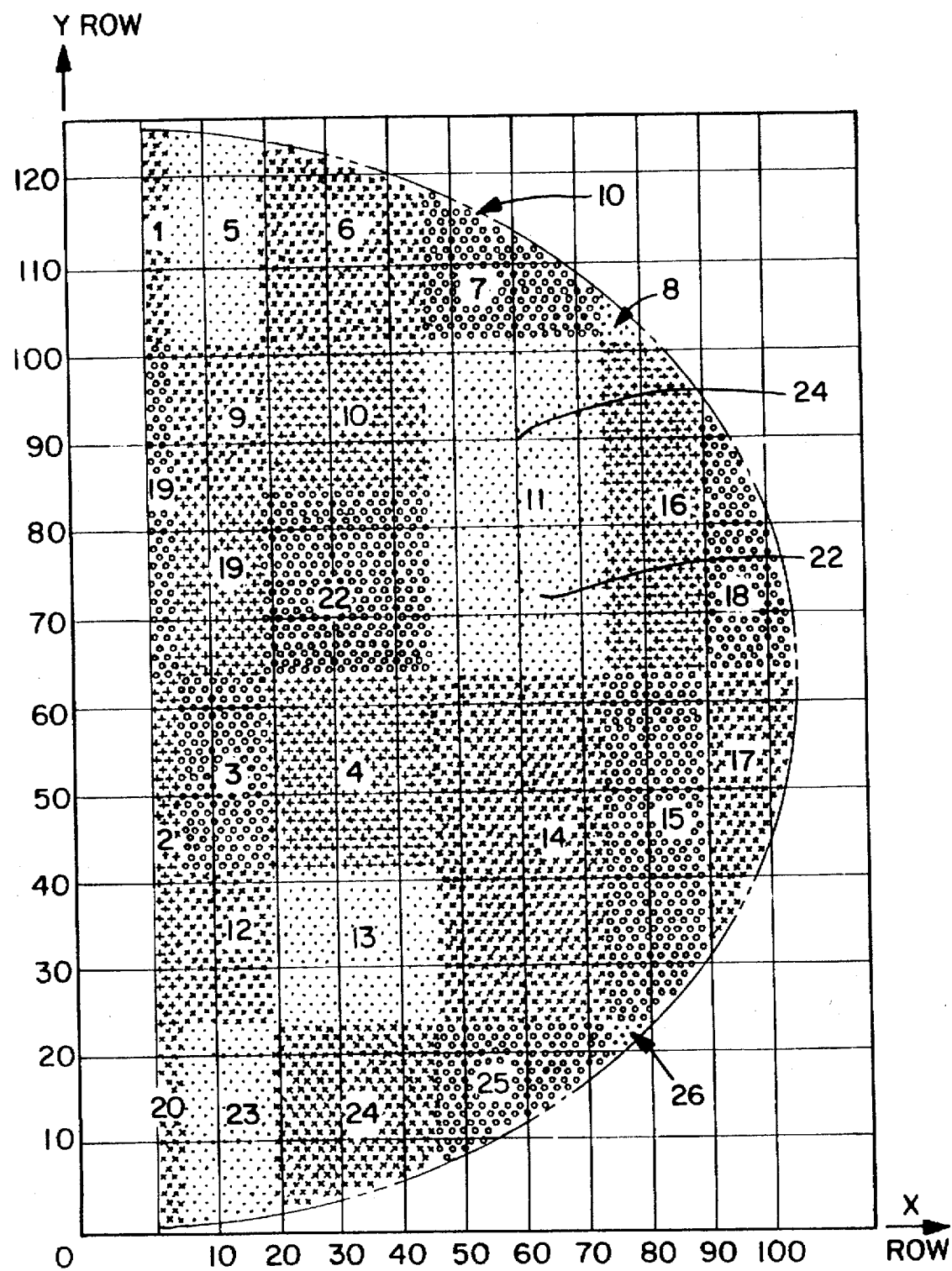
FIG. 4 shows the tube sheet figuratively divided into a plurality of calibration zones.

According to the concept underlying the present invention, the environment irregularity errors, such as pitch variations, and the robot translation error ($\Delta x$, $\Delta y$) and rotation error $\Delta \phi$ are converted into an equivalent robot coordinate offset ($x_o'$, $y_o'$) in a specific area or region of the work cell. This is shown in FIG. 4, where the tube sheet section 10 has been figuratively divided into 26 calibration zones. Each zone can be viewed as an error-tolerance zone, defined as the steam generator geometric area within which translation-compensation can ensure that the final robot position is within the prescribed error tolerance. The specific error tolerance is dependent upon the size and configuration of the specific tool which is to be inserted into the opening. As noted above, if the tool is positioned within the tolerance, it is deemed to be in registry. Therefore, in accordance with the present invention, once the robot has been calibrated in a given zone for a given tool, the tool can be positioned anywhere within that calibration zone, without requiring recalibration of the robot. In addition, the geometric error due to the robot droop is converted for inclusion into the equivalent robot coordinate offset $(x_o',y_o')$ within the given zone.

Thus, all of the three error components (environment irregularity, robot translation and rotation error, and geometric droop error), are included in an equivalent robot coordinate offset $(x_o', y_o')$. These equivalent coordinate offsets are then included directly into the kinematics equations which specify the link articulation whereby the joint angles as computed by the robot kinematics equations will automatically compensate for the total errors.

An example of the implementation of this inventive concept, is set forth immediately below, with reference to FIG. 4. In FIG. 4, the steam generator tube ends, are on a triangularly pitched matrix, with the tube sheet coordinate system row axis X extending from 0–110, and the line axis Y extending from 0–125. The array of tube ends is divided into 26 calibration zones. These zones are substantially quadrant symmetric, i.e., in mirror image about an imaginary line which crosses the tube sheet surface between the 63rd and 64th line). In FIG. 4, it may be appreciated that within a quadrant, each zone has a different shape, and does not necessarily have the same number of openings as another zone. For example, symmetric zones 8 and 26, have only six openings each. As indicated above, each zone is a geometric area of the tube sheet working environment, within which the translation-only compensation can ensure that the error in the final robot position is less than the prescribed error tolerance.

The work station computer 302 (FIG. 3), contains a database or similar information, constituting a map of the coordinates of all the tube openings in the tube sheet coordinate system. Each of the tube opening coordinates is assigned to one of the calibration zones. The current position of the end effector in the tube sheet coordinate system is known or determined, in any conventional manner. As part of the servicing plan, the operator, or the computer via a stored program, selects the coordinate in the tube sheet coordinate system of the next tube opening at which the tool end effector will be positioned by articulation of the arm. For reference purposes, this will be called the first target tube opening 22 and could, for example, be specified by coordinates (64, 73) in the tube sheet coordinate system shown in FIG. 4. In the present example, this coordinate has been assigned to calibration zone 11. The robot arm is moved according to the programmed kinematics equations, to reposition the end effector at the selected tube end. The kinematics equation relates the tube sheet coordinate system to the robot coordinate system. An example of such equation is set forth below.

$$x_t = x_o + L_1\cos(A_1) + L_2\cos(A_2) + L_3\cos(A_3)$$ [Eq. 1]

$$y_t = y_o + L_1\sin(A_1) + L_2\sin(A_2) + L_3\sin(A_3)$$

where $(x_t, y_t)$ are the end effector target coordinates in the tube sheet system and $x_o, y_o$ are the tube sheet coordinates of the origin 0' of the robot system. In this context, $x_o$ and $y_o$ can be viewed as the offset of the robot system origin relative to the tube sheet system origin.

Preferably, the camera 204 is carried in fixed relation to the end effector, so the operator can observe the movement of the tool 202 on the end effector 200, at the monitor 308 associated with the camera (see FIG. 3).

For a variety of reasons, as discussed above, the robot will not necessarily reach and register with the first target tube opening 22. A determination is then made, whether the tool on the end effector as positioned automatically according to the kinematics equation, is deviated from direct registry with the target tube opening. This determination can be made visually, with the camera 204, or with other sensors. Even if the tool registers, the centerline of the tool may still not exactly align with the centerline of the opening. The robot is then jogged to achieve, to the extent possible, exact alignment (but as a minimum registry), between the tool 202 and the first target tube opening 22. The net differential movement associated with the jogging of the end effector, is measured and recorded, i.e., stored in digital form in the computer. These differentials are represented by $(\Delta x_m, \Delta y_m)$.

These differentials are utilized to modify the variables of the kinematics equation as executed in the work station computer 302, and/or the local controller 316, such that $x_o' = x_o + \Delta x_m$ and $y_o' = y_o + \Delta y_m$, are considered as equivalent offset of the robot coordinates, with respect to the tube sheet coordinates. Therefore, the coordinates $(x_o', y_o')$ are used in the robot kinematics equation to calculate the joint angles of the robot, whenever the robot moves within that particular calibration zone, i.e., zone 11. For example, if the end effector is to be repositioned within zone 11, to a second target opening 24 at a new tube sheet coordinate of (60,90), the robot kinematics equation would utilize the same equivalent offset $(x'_o, y'_o)$, as was determined as a result of the differential jogging associated with reaching acceptable registry at the opening on coordinate (64,73).

Preferably each calibration zone is selected to include at least one reference marker. This is a tube opening which was marked with particular indicia during manufacture, for example its coordinate in the tube sheet coordinate system, such that the operator can visually confirm that the tool on the end effector is in alignment with a known reference tube opening. As a result, one procedure for inspecting and/or servicing a multiplicity of tubes throughout the tube sheet in accordance with the invention would be for the on-line calibration technique to be implemented at a reference tube opening, e.g., in zone 11, whereas the robot is calibrated for that zone, and thereafter performs all the inspection or servicing on all the subsequent target tubes in that zone. If any tubes are to be inspected or serviced in another zone, the end effector is moved to a reference opening in that zone, jogged to determine the required differentials for alignment and/or registry, and the kinematics equations are adjusted according to the differentials associated with the jogging for the reference tube in the other zone. Thereafter, all the tubes in that other zone which require inspection or service, are handled without the necessity for recalibration.

This sequence of recalibrating once within each successive zone, can be continued, for all zones which are within the reach of the robot.

It is not necessary, however, that the first target tube opening 22 in any given zone, be a reference opening. Other techniques are known for confirming the position of the end effector, although such techniques may require a greater processing time than the visual confirmation by the operator for a reference opening. For example, the jogging of the robot arm to achieve precise alignment of the end effector (tool) with the first target tube opening (or reference opening), could be achieved automatically, by the robot having fine degree dynamic position tracking and control capability. The invention described in the next section of the present specification, could be adapted for this purpose.

As a result of implementing the foregoing invention, the revised kinematics equations can be expressed for movement within a given calibration zone, as follows.

$$x_c = x'_o + L_1\cos(A_1) + L_2\cos(A_2) + L_3\cos(A_3) \quad [\text{Eq. 2}]$$

$$y_c = y'_o + L_1\sin(A_1) + L_2\sin(A_2) + L_3\sin(A_3)$$

where $x_c$, $y_c$ are the target coordinates of the end effector in the tube sheet coordinate system, after calibration. This is equivalent to $$x_c = x_t + \Delta x_m \quad [\text{Eq. 3}]$$

$$y_c = y_t + \Delta y_m$$

which can be understood as defining that the calibrated coordinate ($x_c$, $y_c$) is obtained by reaching the apparent target coordinate ($x_t$, $y_t$) of the kinnematics equations and then jogging the end effector by the increments ($\Delta x_m$, $\Delta y_m$) to achieve actual registry with the target tube opening.

The theoretical basis for the invention, whereby at least three actual translation and rotation errors $\Delta x$, $\Delta y$, $\Delta \phi$ (and others) are not ascertained individually, but rather included within the measurement of only two differentials $\Delta x_m$ and $\Delta y_m$, can be understood from the following:

$$x_c = x_t + \Delta x + x_o\cos(\Delta\phi) + y_o\sin(\Delta\phi) \quad [\text{Eq. 3}]$$

$$y_c = y_t + \Delta y - x_o\sin(\Delta\phi) + y_o\cos(\Delta\phi)$$

This is a non-linear equation. If this equation is extended by Taylor series expansion, $$x_c = x_t + \Delta x + x_o(1 - \tfrac{1}{2}\Delta\phi^2) + y_o\Delta\phi$$

$$y_c = y_c + \Delta y - x_o\Delta\phi + y_o(-1\tfrac{1}{2}\Delta\phi^2)$$

Ignoring the second order error, the position error of the robot can be expressed as $$dx(i) = \Delta x + y_o\Delta\phi$$

$$dy(i) = \Delta y - x_o\Delta\phi$$

Suppose the one point measurements in the calibration are $dx_m$ and $dy_m$. Thus, $$dx_m = \Delta x + y_o\Delta\phi$$

$$dy_m = \Delta y - y_o\Delta\phi$$

The errors of ($\Delta x$, $\Delta y$, $\Delta\phi$) are considered as invariable, due to the way the robot is secured in the fixed environment. Thus, $$dx(i) = dx_m$$

$$dy(i) = dy_m$$

The kinematics equations could also be expressed in terms of the robot coordinate system. Suppose P is an arbitrary point in the tube sheet coordinate ($x_i$, $y_i$). The coordinate of P at x"0"Y"(x",y") can be represented as $$x'' = L_1\cos(A_1) + L_2\cos(A_2) + L_3\cos(A_3)$$

$$y'' = L_1\sin(A_1) + L_2\sin(A_2) + L_3\sin(A_3)$$

The coordinate of P in the X' O' Y' system (x', y') can be represented as $$x' = x''\cos\phi_o + y''\sin\phi_o$$

$$y' = -x''\sin\phi_o + y''\cos\phi_o$$

Finally, the coordinate of P at XOY can be expressed. Ignoring the second order error, as $$x_i = x_o + x'' + y''\phi_o$$

$$y_i = y_o - x''\phi_o - y''$$

Those familiar with this field of technology, will appreciate the significant advantages resulting from this invention. The calibration algorithm is very simple and easy to implement. Calibration can be performed while the robot works in a production mode, thereby minimizing the calibration time. Furthermore, since any error generated by the environment is converted into the joint translation and rotation error, all of the errors attributable to the environment are inherently taken into account by the inventive method. Thus, relative to existing technology for calibration of robots for use in steam generator inspection and servicing, the present invention is more accurate, saves time and thereby results in a quicker procedure, and is more resistant to environment errors.

It should be appreciated that although the foregoing technique is preferred, the predefined plurality of calibration zones can be used with other calibration algorithms implemented within each zone. For example, once the end effector is at a reference opening within a particular calibration zone, the end effector can be moved to several different openings, thereby providing multiple points for use in a least squares calibration technique. Although the combination of multiple calibration zones and least square calibration within each zone would represent an improvement relative to the current calibration techniques, this would not provide all the advantages of the preferred single point calibration technique described above.

III. Dynamic Position Tracking And Control With Redundant Multi-Sensory Integration The apparatus and method according to this invention provide for dynamic position tracking and fine motion control of a robot end effector, particularly for use in the remote servicing of a nuclear steam generator.

Two significant problems arise in current robot tracking and position control as used in nuclear service applications. Due to robot mechanical error and measurement error, the fine motion of the robot end effector must be toggled around the position which would provide alignment with a target tube opening, thereby considerably delaying the actual inspection or service activity. Furthermore, in order to avoid the mistake of repairing the wrong tube, regulations require that position verification be implemented every 20 consecutive tube repairs. Repair activity occurs only after the repairable tube candidates are re-inspected to confirm that the tube is in fact flawed. All these checks are quite time consuming.

The object of the present invention, is to provide a vision-based closed loop control system and method for the robot controller. With this closed-loop control strategy, the robot will track the tube position, identify and verify the tube position independently, and furthermore, control the final position automatically.

This is achieved by tracking and detecting the target position through redundant multiple sensing, comparing the measured target position with a reference position, and achieving registration at the target position, using adaptive PID (Proportional-Integral-Derivative) control feedback.

Figure 5:
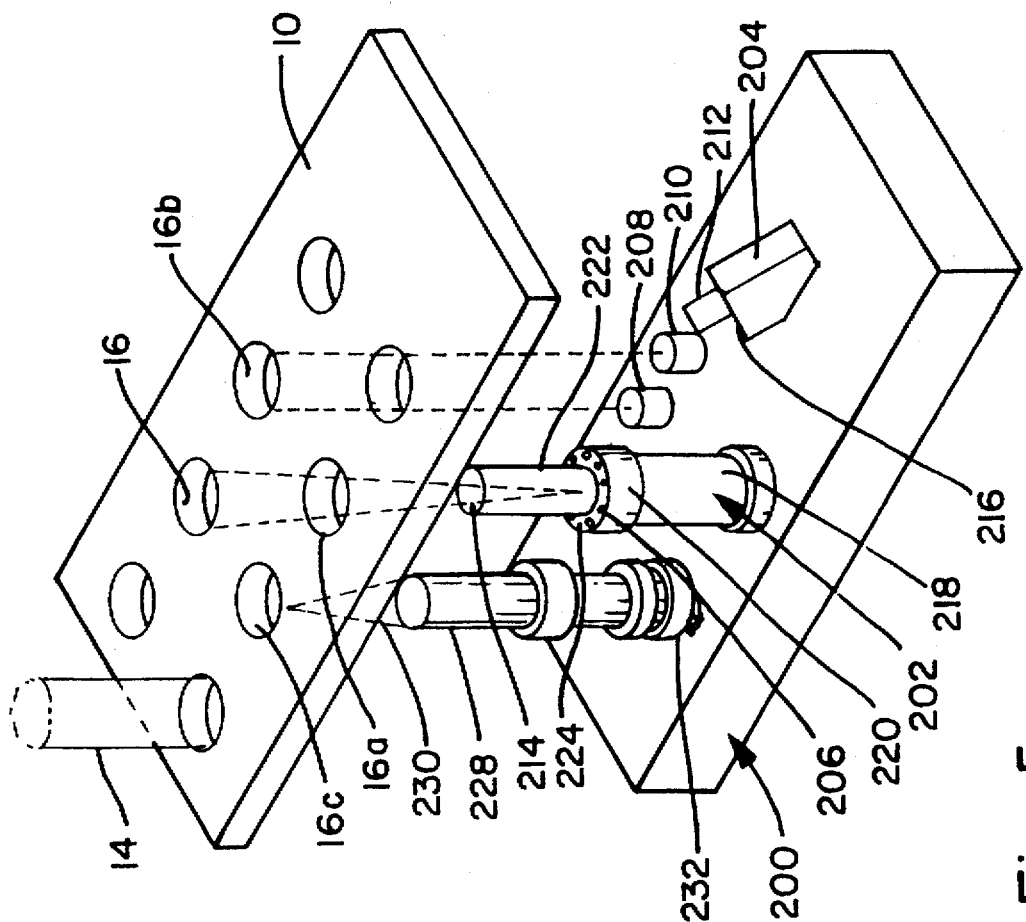
FIG. 5 is a simplified perspective view of a multi-sensory end effector for dynamic position tracking and control of the tool carried thereon.

FIG. 5 is a schematic illustration of an end effector 200 carrying a multi sensing system according to the invention, located immediately below a plurality of regularly spaced apart openings 16 in a portion of tube sheet 10. All but one of the tubes 14 which are secured at the tube openings, have been omitted for clarity.

The end effector 200 is positioned by a robot under the control of a computer, preferably as part of the system represented in FIGS. 1 and 3. The robot 100 or manipulator, has a base 102 fixed with respect to the tube sheet 10, an articulated arm 104 for moving parallel to the tube sheet, and an end effector 200 carried by the arm for sequential positioning under a plurality of selected tube openings. The end effector carries a tool 202 which is actuable in a direction perpendicular to the tube sheet for insertion into a respective selected tube opening 16a. This tool can be an inspection tool, or repair tool, or other device for performing an operation on the tube associated with a particular tube opening.

The sensory system is carried by the end effector, for dynamically tracking the position of the tool relative to a selected tube opening. The sensory system includes a vision tracking subsystem, utilizing CCD camera 204 with lens 212, for generating an image of the tube sheet and preferably the end 214 of tool 202. Typically, this image would include an array of a size somewhere between about 4×4 and 10×10 openings. This is the image viewed by the operator as a scene 307 within field of view 305 on the monitor 308. An image grabber board 306 in the host computer 302, is used to capture and digitize at least a portion 309 of the scene, preferably an area limited to coverage of only one full tube opening 16', although sectors of adjacent openings such as 16" can be included. This digitized image 309 is used by the vision tracking subsystem to generate a first signal commensurate with the spatial relationship of the tool 202, to the selected tube opening 16a. Stated differently, the vision subsystem provides an image of a portion of the tube sheet of interest to the operator, and also generates a signal (to be used for automatic control purposes as described below) indicative of how close the tool 202 is to alignment relative to the selected tube opening 16a.

Ideally, the tool 202 includes a base 218 fixed to the end effector, having a substantially cylindrical collar 220 that has a slightly larger outer diameter than the diameter of an opening 16 in the tube sheet. The operative portion 222 of the tool projects from the collar, and of course, has a diameter which is slightly less than that of the tube opening. This dimensional relationship provides for a ring or annulus 224 on the collar, on which illumination light sources 206 are provided. The illumination for the camera can alternatively be provided by light sources 216 carried by the housing, for example, annularly surrounding the lens 212. Preferably the lens 212 of the CCD camera 204, projects obliquely from the camera housing, in the direction of the terminus 214 of the tool 202, such that the tool, the tube opening closest to the end of the tool, as well as at least the immediately surrounding neighboring openings, are in the field of view of the camera.

The sensory system also includes an optical sensor subsystem, for projecting a structured light beam toward the tube sheet at the location of the selected tube opening 16a or a proxy opening 16b. Because the openings are on a known matrix, the structured light beam can be projected from source 208 to a laterally spaced tube opening 16b having a known offset from the selected tube opening 16a. Very little difference is likely between the distance from the centerline of tool 202 to the centerline of adjacent structural light source 208, and between the center of target opening 16a and the center of adjacent opening 16b at which the structured light beam would be aimed. The structured light pattern will be reflected by the tube sheet 10. The reflection also forms a structured light pattern, which varies in accordance with the spatial relationship between the projected structured light beam, and the selected tube opening. Means such as one or more imaging sensors 210, are provided for receiving the structured light pattern reflected by the tube sheet. The reflected pattern as received, is sensed as a pattern, and a second signal is generated commensurate with the spatial relationship of the reflection to the selected tube opening.

Figure 7:
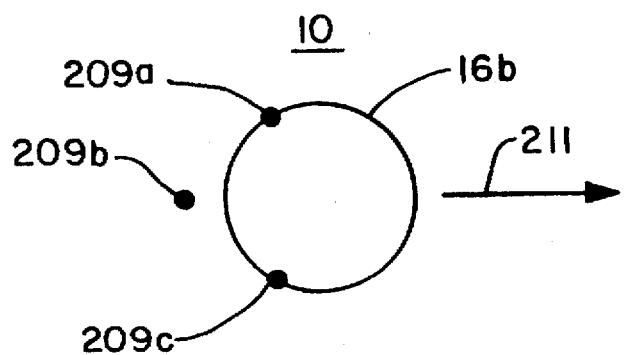
FIG. 7 is a schematic representation of a reflected structured light pattern produced by a laser source on the end effector of FIG. 5.

It can be appreciated that in this configuration, if e.g., four light sources are arranged such that the projected light pattern from all four source 208 enters the opening 16b immediately inside the circumference of the opening, the light will travel without obstruction into the tube, without generating a reflection at the sensors 210. This condition can reliably indicate precise alignment of the tool 202, with the tube opening 16a. Any degree of misalignment, will produce a structured light pattern at the sensors 210, the character of which provides a direct indication of the direction and degree of deviation between the tool and the tube opening. FIG. 7 is an example of a sensed reflected light pattern, in which three out of the four light source beams have been reflected at 209a, b, c, and sensed. The processor in the computer 302 (FIG. 1), generates a signal indicative of the direction of movement by the tool 202, necessary for achieving alignment (and therefore a disappearance of all the reflections). For example, movement to the right as indicated by arrow 211 would bring all dots within the opening represented by the circle.

The end effector 200 also carries a mechanical guide 228 which is located one nominal pitch distance from the tool 202, for insertion into an opening 16c adjacent to the target opening 16a, in a manner which closely resembles the insertion actuation of the tool. The leading end 230 of the guide is preferably conical, and extends to a height slightly greater than that of the leading end 214 of the tool, whereby the conical portion will encounter and sense an obstruction due to misalignment, before the tool actually enters the target opening.

Figure 8:
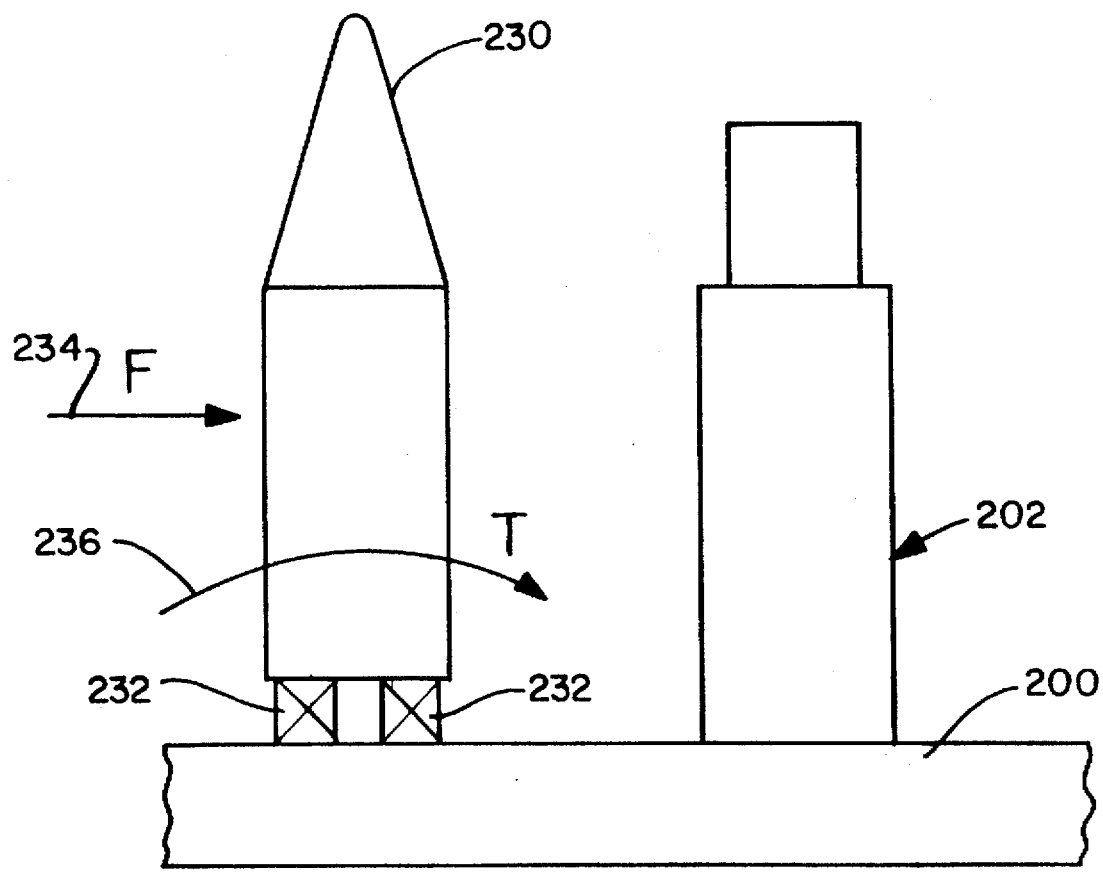
FIG. 8 is a schematic showing the force and torque sensors that can act on the probe of the end effector of FIG. 5.

As shown in FIG. 8, the guide serves as a probe with associated sensors 232, which are responsive to at least one of force and torque encountered by the probe, while the probe 228 is actuated for entry into the respective tube opening 16c. The sensing of either one of force or torque is acceptable, although sensing both is preferred. It should be understood that the torque and force sensors could be located directly on the tool 202, rather than as a proxy probe as illustrated in FIG. 5.

If the misalignment occurs due to deflection of the robot arm, the probe will sense the force and torque simultaneously. The tool may carry a compensator responsive to this condition, to correct the lateral and rotational misalignment. Thus, means are provided for generating a third signal commensurate with at least one of the sensed force or torque. FIG. 8 shows the typical force vector 234 that arises from a force component parallel to the tube sheet plane and a torque vector 236 causing a pivot in the probe, about the connection to the base of the end effector. The force and torque sensing subsystem uses a transducer and intelligent controller, of a type that is readily assembled or designed, for measuring and controlling the force and torque of the robot arm.

Figure 9:
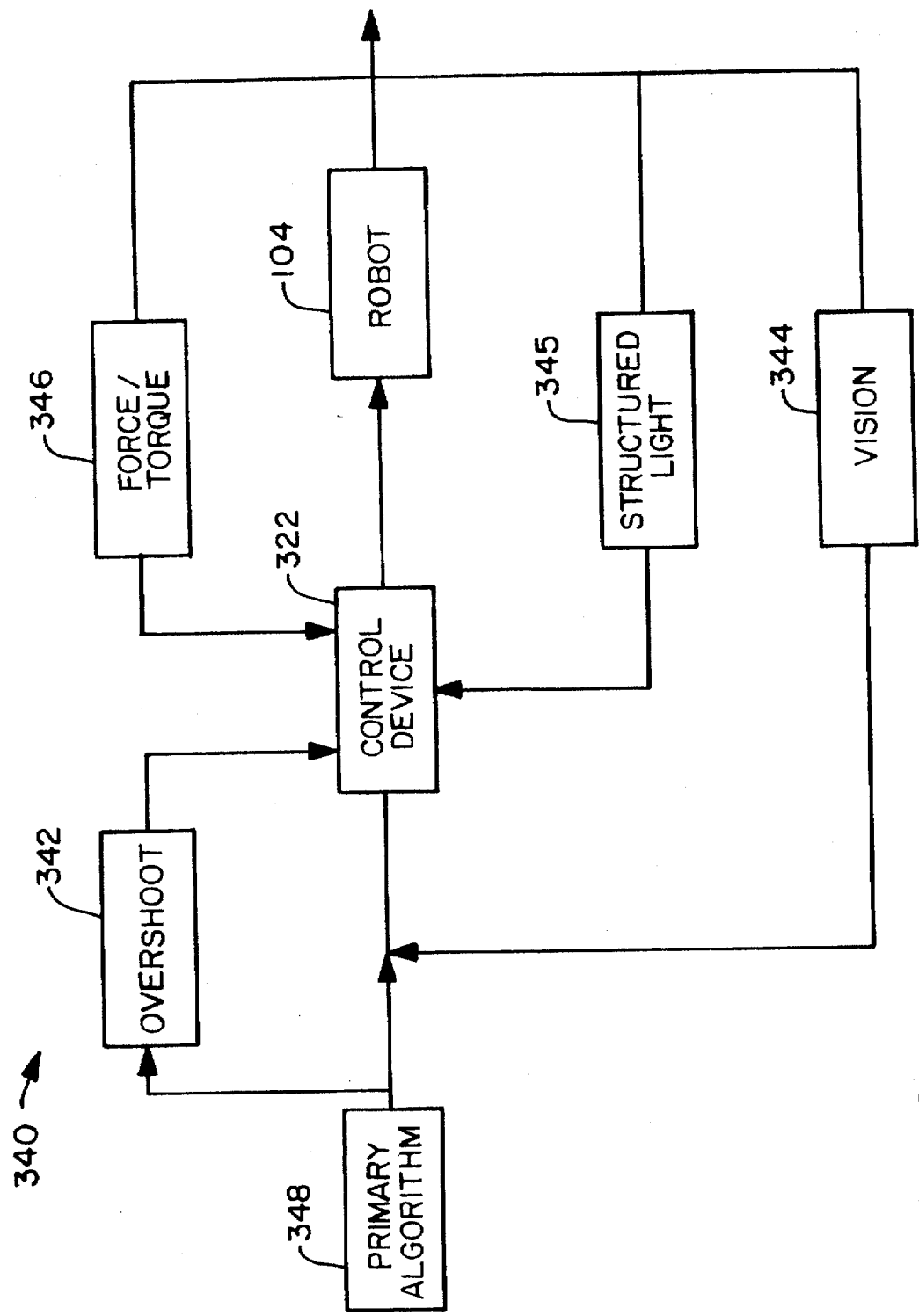
FIG. 9 is a block diagram of the preferred PID control logic based on the multisensory end effector of FIG. 5.

FIG. 9 represents the preferred means 322 in the computer 316 responsive to the first 344, second 345 and third 346 signals, for controlling the arm to center the tool at the selected opening. Preferably, a PID control system logic 340 is utilized for this purpose. The control system 340 simulates the skeletal-muscle servo mechanism of a human. The primary control signal is generated at 348 as a result of the solution to the kinnematics equations to move the robot arm to the target opening. The control system includes a feed forward control loop 342 responsive to the voltage and current associated with the primary signal 348, to arrive at the target while avoiding overshoot, and an active position feedback loop 344 based on the vision tracking subsystem (first signal). The signals from 342, 344 and 348 can be considered as producing a coarse degree of control. When the foregoing control action locates the tool at the target opening, a fine degree of control is actuated. This includes an inner feedback signal 345 from the structured light pattern, and another inner feedback loop 346, which provide for passive position control. The force feedback 346 is configured to compensate for the force disturbance. In a variation of the so-called "fuzzy logic" intelligence, each of the inputs to the controller 322 can be weighted differently, according to the influence that will likely result in smoothly reaching the desired registration, without hunting or overshoot.

From the foregoing, it can be appreciated that the method according to the invention, includes the first step of primary positioning the tool closer to the selected tube opening, than to any other tube opening. This would typically be implemented by one or both of a robot kinematics equation (e.g., Equations 1 and 2), or a vision based tracking technique (e.g., as described in Section IV below). A structured light beam is projected toward the tube sheet at the location of either a selected tube or a laterally spaced tube opening, thereby producing a reflected light pattern. The reflected light pattern is sensed, and the sense pattern is compared to at least one preestablished reference pattern corresponding to the tool being centered below the tube opening. From this comparison, a signal is generated commensurate with the deviation of the current position of the tool relative to the center of the selected tube opening. In response to this deviation signal, the arm is moved to reduce the deviation. The signal commensurate with the deviation may be used in conjunction with the variables that are utilized for the primary positioning of the tool, to obtain apparent registry. The tool, or preferably a guide probe, is then actuated to initiate entry into a tube opening. At least one of a force and a torque vector component is sensed on the probe or tool, as imposed on the end effector as a result of vertical misalignment in the contact of the probe or tool with the tube sheet during actuation. Another signal is generated commensurate with at least one of the force or torque vector components and, in response to the other signal, the arm is controlled to reduce the magnitude of the vector components. The tool is then fully actuated with assurance of entry into the selected tube opening.

IV. The Preferred Moving Object Tracking

The kinematics equations associated with robot arm movement, can, with the preferred on-line calibration technique described above, accurately displace the end effector from a present position in a particular tube opening, to a non-adjacent target tube opening. Nevertheless, it is desirable to confirm that the end effector (or by proxy another component carried by the end effector) has in fact moved from the initial position to the target position. It is also desirable that, as described above with respect to vision subsystem of the multi-sensor end effector and control system of FIG. 9, the movement of the end effector be tracked and a signal commensurate with the spatial relationship of the tool to the selected tube opening (e.g., trajectory) be supplied to the controller.

According to this third inventive development, a computer vision system is implemented, preferably in the context represented in FIG. 3, for dynamically tracking the position of a moving camera relative to a stationary object, or conversely, dynamically tracking an object moving through the field of view in a stationary camera.

The key features of dynamic tracking according to the invention, are relative reference, relative tracking, and position prediction. Relative reference means that in the correlation between a reference signal and a detected signal, the reference is taken as an image that was digitized on-line, i.e. during the tracking. This is contrasted with other methods where a fixed template, or the template defined at the beginning of the image acquisition series, is the reference. Relative tracking means that all the detected positions are determined based on relative distances from a position previously determined on-line. The absolute position is accumulated from the relative positions. Position prediction means that the next relative position can be predicted from the derivative rate of the historical position changes. This gives estimation of the next relative position, and also serves as a check on the reasonableness of the next position detection.

In conventional tracking algorithms associated with image correlation technology for tracking relative movement in a scene, a reference image containing the desired object is used to correlate with images containing the moving object. This method is sensitive to the scale, rotation, and distortion variations of the input image. When the image of the moving object gets scaled, rotated, or distorted, the quality of correlation degenerates, resulting in the false detection or missing of the tracked object. Although some distortion invariant filters have been proposed, they are too sensitive to noise, particularly in the context of tracking a tool relative to a steam generator tube sheet.

Figure 6:
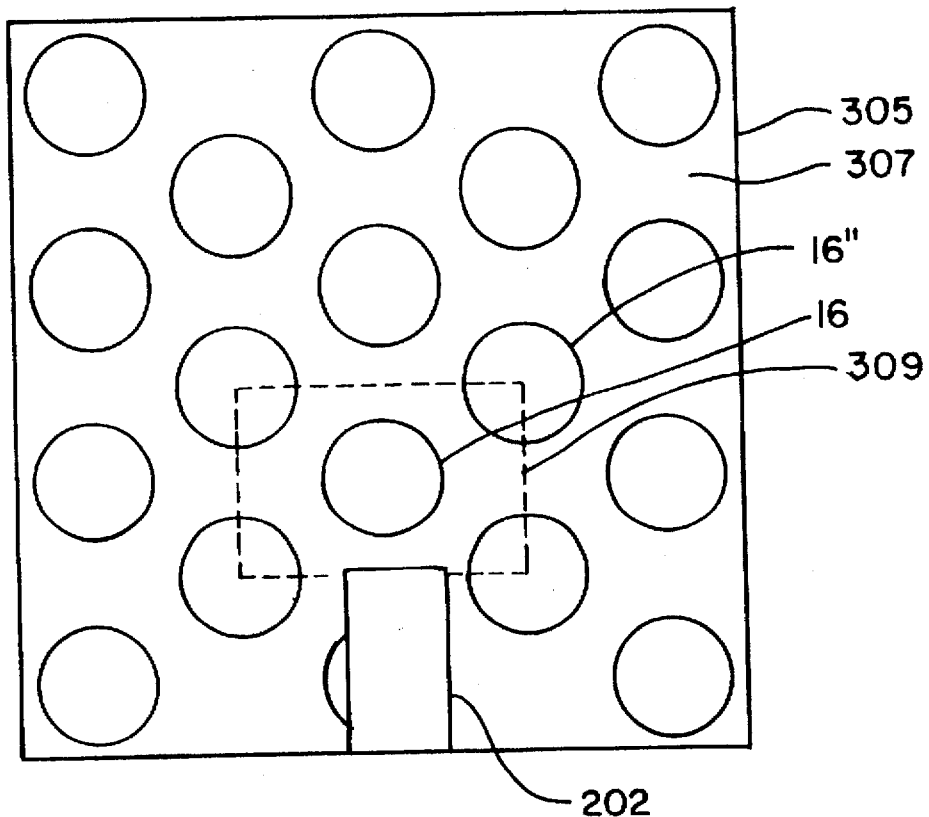
FIG. 6 is a schematic representation of a typical scene of a portion of the tube sheet as appears in the field of view of the camera mounted, for example, on the end effector of FIG. 5.
Figure 10:
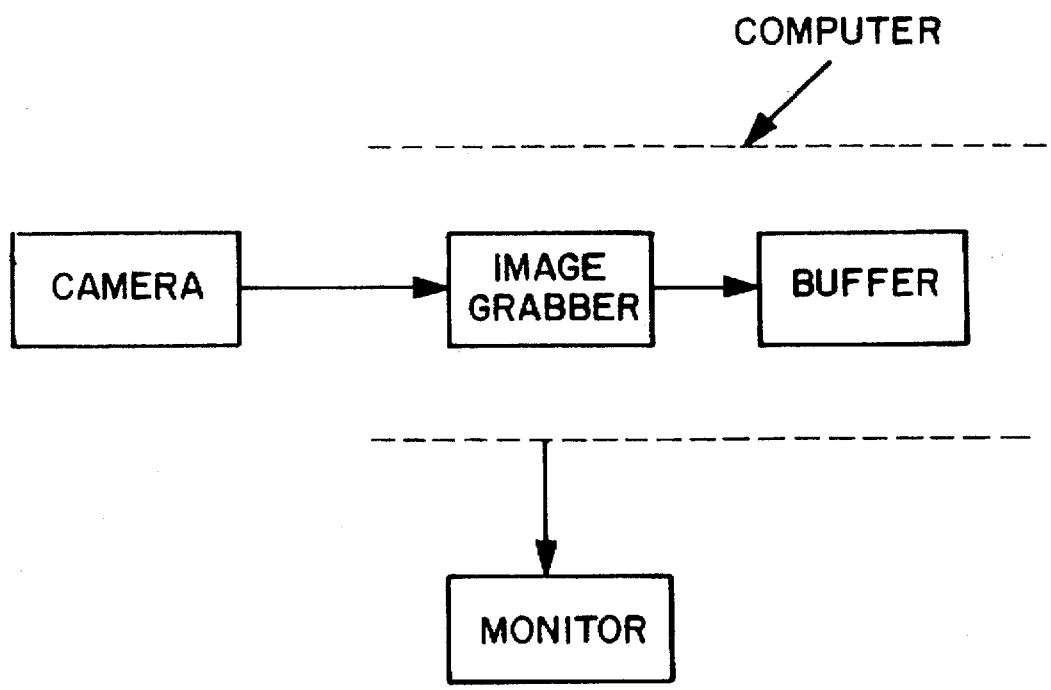
FIG. 10 is a schematic representation of the relationship of the camera, computer and monitor, for use in the tracking of relative movement between the camera and the scene in the field of view of the camera.
Figure 12:
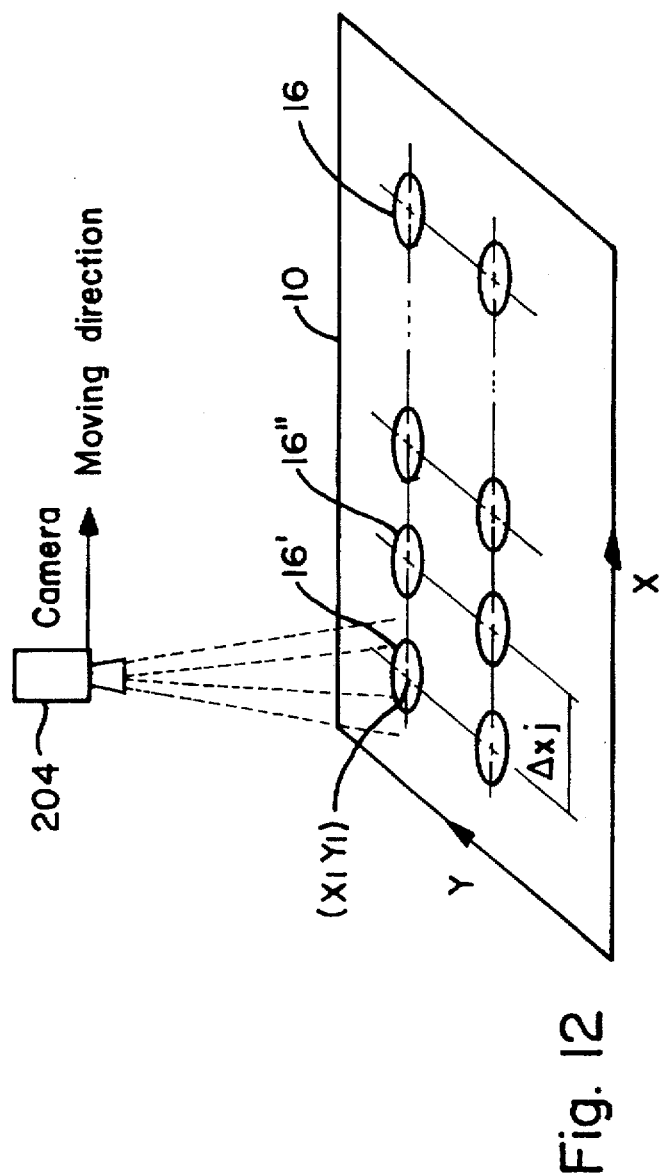
FIG. 12 is a schematic of the camera moving linearly along the tube sheet.

FIG. 10 is a schematic representation of the camera 204, such as shown in FIG. 5, the work station or host computer 302, such as shown in FIG. 3, and an associated monitor 308 at the work station. The video board 306 in the computer includes an image grabber (digitizer) 350 and a buffer 352, where the data constituting the digitized image can be temporarily stored. The video monitor 308 is connected to the output of the image acquisition board, to display the live image from the camera and the portion 309 used for tracking (as exemplified in FIG. 6). In this particular example, the camera 204, being fixed relative to the end effector 200, moves with the end effector, relative to the stationary tube sheet 10. FIG. 12 shows a camera 204 for movement along a tube sheet 10 with openings 16. FIGS. 13a–f show an illustrative example of a sequence of digitized scenes 309 which include the object of interest 16' as the camera moves in time, thereby generating a continuously changing image signal. This figure will serve as a basis for describing the inventive concept of dynamic tracking based on a relative reference template. The opening 16' is a dimensionally invariant object which appears to pass through the image portion 309 as the camera moves. Practitioners in this technology can readily understand an analogous sequence (not shown), wherein the background (tube sheet) in each scene remains unchanged (because the camera is stationary), and the object moves. Typically, the working distance of the camera relative to the tube sheet, is on the order of a few inches.

It is well known that in pattern recognition technology, the system must first recognize the object throughout the period of movement. Conventionally, this is achieved by comparing the object in the changing scene, to a reference template of the object. The second step after recognizing the object, is to locate it at a point in time corresponding to a particular view of the environment. The path or trajectory is defined by the time dependence of the "locating" step. As noted above, if the recognition is attempted against a single reference template, a number of factors cause deterioration of the correlation, and therefore uncertainty in the trajectory.

It is a purpose of the present invention, to maintain a high correlation threshold with a relatively simple technique, while avoiding direct feature correlation against a master template.

This is accomplished in a general manner, by capturing a sequence of images containing the object moving in a field of view or a scene, which are digitized through the camera and image acquisition board, then sent to a buffer. A filter is created from the first image of the object in the image sequence. This filter is used to detect the displacement of the object in the sequence. That is, the object in the first image of the sequence is used as a reference object, and is correlated with the other images, which are considered as the input images of the correlation. Thus, the images subsequent to the image on which the filter was based, are compared in sequence to the filter, to track movement of the object within the sequence. The location of the correlation (peak correlation) between the reference and each input image of the sequence, is used to indicate the location of the desired object, the time of each input image was acquired. The connection of the correlation peaks creates the moving trajectory of the object within the sequence.

This capturing of images in the sequence proceeds rapidly. The sequence is divided into a plurality of sets, each of which has a reference image, such that the comparison of any particular image, is made to a reference that was relatively recently established, rather than to an invariant reference established before initiation of movement. Because the reference object image used to generate the filter and the input images are all taken from the same set of images within a short period of time, they correspond to similar motion behavior of the moving object. Thus, they have the same small scale and rotation variations. This ensures the quality of correlation.

Figure 11:
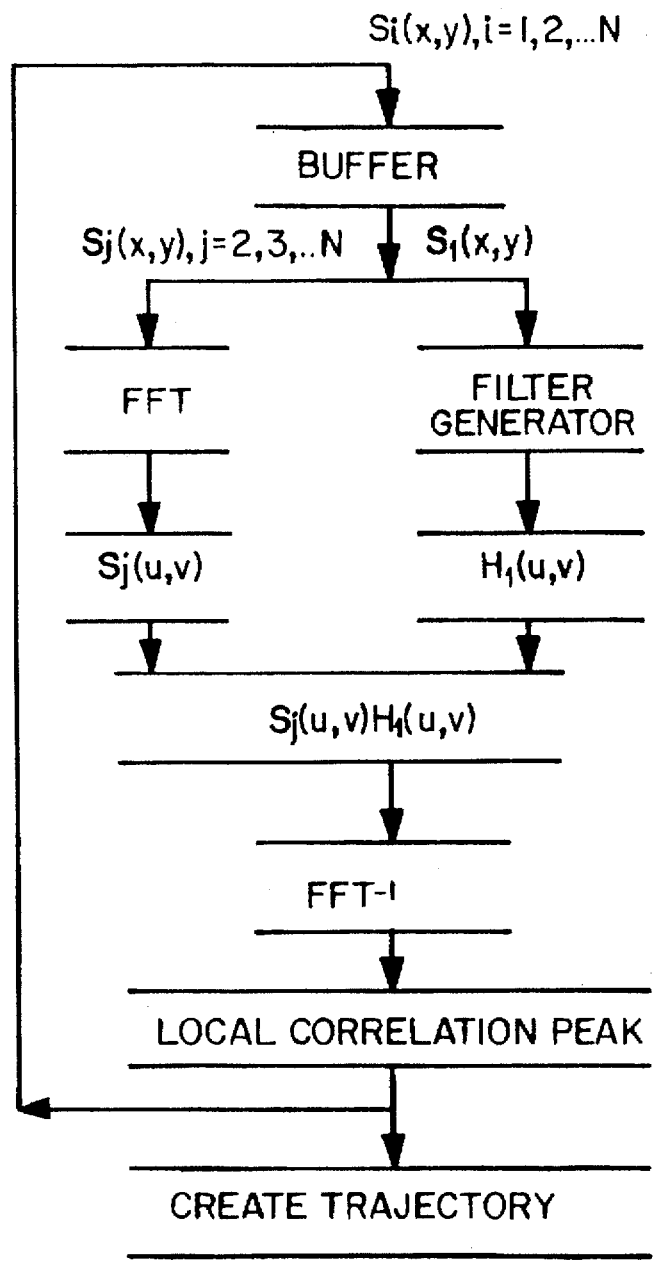
FIG. 11 is a flow chart representation of the logic for tracking a moving object using the images captured by the hardware represented in FIG. 10.

The procedure can be illustrated with reference to FIGS. 11 and 12. A sequence of discrete images Si (x, y), where i varies from 1 to N, are captured and digitized in the grabber board and stored in the computer buffer. The first image S1 (x, y) is used to create the filter H1 (u, v), which is the phase conjugation of the Fast Fourier transform for $s_1(x, y)$. This filter can be a linear matched filter, or a non-linear filter such as a phase only filter, depending on the environment and the noise level. The Fast Fourier transform is applied to the other, "input" images Sj (x, y) of the sequence respectively (where j=2, 3, . . . N), and the resulting Sj (u, v) are multiplied by H1 (u, v). The product of the Fourier transform of the input images and the filter is then inversely Fourier transformed, and the correlation peaks are detected respectively. The connection of the correlation peaks shows the trajectory of the moving object within the segment of the recorded sequence. The formulation and use of such filters, Fourier transforms, inverse transforms and correlation of peak intensities, are well known in the field of computerized image tracking.

The camera and associated vision hardware captures and digitizes a continual sequence S of discrete images, at a respective sequence of T points in time. This sequence is divided into sets, which can be conveniently chosen such that, for example, each set K contains ten sequential images (i=1, 2, . . . 10). Therefore, the first image of set 1 is S1,1; the first image of set 2 is S2, 1; and the tenth image of set 3 is S3,10. Preferably, the last image in a given set (e.g., S1, 10 also serves as the reference image in the next set (e.g., S2, 1). Likewise, the filter for set 1 is H1, 1; the filter for set 2 is H2, 1, and the filter for set 10 is H10, 1, but since the filter is always generated from the first image of any particular set k, any filter H can be uniquely identified by HK.

Therefore, for each set of discrete images Sk, i, image Sk, 1 defines filter Hk, and one of the trajectory point is determined for each correlation peak of the comparison of each of Sk, 2 . . . SkN with Sk, 1. The position of the moving object in each Sk, j is recorded as the change in position of the object during the time interval corresponding to (Tk, jTk, 1). The trajectory as computed in this manner, can be used to confirm that the end effector is moving along a path which is consistent with displacement of the end effector from the current to the target position.

As a practical matter, in the context of a steam generator tube sheet environment, the camera would typically be shooting at a rate of 30 frames per second, and the end effector would typically be moving at a peak velocity of approximately five inches (12.7 cm) per second. Therefore, during the course of moving five inches, 30 scenes could be captured and digitized. A typical opening for a tube in a tube sheet is about one half inch, and the pitch (distance between centers of adjacent tube openings), would be on the order of about 1.5 inches (3.8 cm). In this context, the number of digitized scenes in a set would preferably be about 10, corresponding to displacement of the end effector, approximately one pitch distance. With respect to FIG. 11, this means N=10.

The number N of images in a set of discrete images S1, i (where i=1, 2, . . . N) is determined by the speed of the moving object (or moving camera). The requirement for N is that the first image and last image of the set should include the moving object and the correlation between the first image in the set (which is used to generate the filter) and any other images in the set, can indicate the position of the object in the corresponding image relative to the object in the first image. If each i represents a fixed time increment, say 10 milliseconds, then if N is too large, the object in the first image and the object in the last image of the set may be quite different in terms of size or/and orientation, such that the correlation peak of the two images is too small to indicate the relative position of the object in the scene.

With the trajectory determined, the velocity and acceleration, estimate time of arrival, and closest proximity to target can be inferred. If the speed of the moving object is calculated from the trajectory then the number N of image in a set can be determined based on the requirement for N. A signal commensurate with one or more of these spatial relationships of the tool to the target tube opening can be generated for use in, e.g., the feedback control loop 344 shown in FIG. 9.

Figure 13:
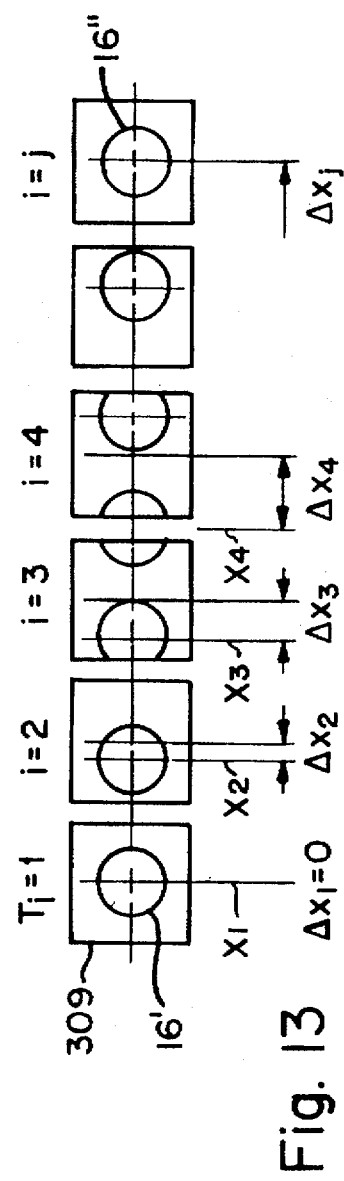
FIGS. 13(a)–(f) are schematic representations of the images in the field of view of the camera at discrete time points during the camera movement represented in FIG. 12, as illustrative of dynamic tracking based on a relative reference template.

FIGS. 12 and 13 illustrate the sequence of dynamic tracking. This could readily be adapted to the special case where each image serves as a reference for the next image. The camera is shown for simplicity as moving along the X-direction only. At starting time $T_1$, the camera is aligned with the center of the tube opening 16'. The first reference tube position, per FIG. 13(a), is calibrated as $(X_1, Y_1)$, and this reference tube image is used as a template to correlate with itself. Thus, the relative position offset of the image is $\Delta X_1=0$. Then, at time $T_2$, the second image, per FIG. 13(b), is the input signal, which is correlated with the reference template, from FIG. 13(a). Now the offset of the second image represents the relative position offset of the camera from the position at $T_1$ to the position at $T_2$.

Suppose the offset of the second image (at $T_2$) relative the first image is $\Delta X_2$. Then the actual position offset of the robot at $T_2$ is $$dx_2 = f(\Delta X_2),$$

where f is a collinear transformation from the image offset to the actual position offset. Thus the actual robot position at time $T_2$ (FIG. 13(b)) is $$X_2 = X_1 + dX_2$$

Similarly, take the third image (at $T_3$ in FIG. 13(c)) as the input signal and the first image (at $T_1$ in FIG. 13(b)) as the reference template. The offset of the third image to the first image is $\Delta X_3$, and the actual position offset of the robot at $T_3$ is $$dX_3 = f(\Delta X_3)$$

and the actual robot position at time $T_3$ is $$X_3 = X_1 + dX_3$$

Continuing this process, the general expression of this dynamic tracking for any position coordinate X at time point i is, $$dX_i = f(\Delta X_i)$$

$$X_i = X_1 + dX_i$$

It should be appreciated that this inventive technique is usable in a wide variety of computer vision systems and environments.

We claim:

1. In a heat exchanger while out of service, having a substantially planar tube sheet which defines a multiplicity of laterally spaced tube openings each of which is centered at a coordinate on a tube sheet coordinate system having an origin on the tube sheet, and a robot under the automatic control of a computer and optionally under the remote manual control of an operator, the robot having a base fixed with respect to the tube sheet, an articulated arm for moving parallel to said tube sheet, and an end effector carried by the arm for sequential positioning in a robot coordinate system which is offset from the tube sheet coordinate system, to register sequentially with a plurality of selected tube openings, a method for calibrating the movement of the arm to account for environmental irregularity errors and robot translation and rotation errors comprising:

(a) storing a database of the coordinates of all the tube openings in the tube sheet coordinate system;

(b) assigning each coordinate of the database, to one of a plurality of calibration zones;

(c) from measurements taken at a single tube opening in each of the plurality of calibration zones, converting said environment irregularity errors and robot translation and rotation errors into an equivalent robot coordinate offset which is unique to and remains constant within each calibration zone.

2. The method of claim 1, wherein the calibration is performed at one opening in a first zone, the robot moves the tool according to kinematics equations recalculated according to said equivalent coordinate offset, for registry with and servicing of a plurality of other tube openings in said first zone, without recalibration, and the robot moves the tool to a second zone and is recalibrated at a second opening, in said second zone, and the robot moves the tool according to the recalibrated kinematics equations for registry with and servicing of a plurality of other tube openings in said second zone, without recalibration.

3. The method of claim 1, wherein said single tube opening is a reference opening which has visually observable indicia thereat, uniquely identifying the position coordinates of the reference opening.

4. In a heat exchanger while out of service, having a substantially planar tube sheet which defines a multiplicity of laterally spaced tube openings each of which is centered at a coordinate on a tube sheet coordinate system and a robot under the automatic control of a computer and optionally under the remote manual control of an operator, the robot having a base fixed with respect to the tube sheet, an articulated arm for moving parallel to said tube sheet, and an end effector carried by the arm for sequential positioning in a robot coordinate system which is offset from the tube sheet coordinate system, to register sequentially with a plurality of selected tube openings, a method for controlling the movement of the arm comprising:

(a) storing a first database, of the coordinates of all the tube openings in the tube sheet coordinate system;

(b) assigning each coordinate of the first database, to one a plurality of calibration zones;

(c) determining the position of the end effector in the tube sheet coordinate system;

(d) selecting the coordinate in the tube sheet coordinate system, of a first target tube opening, to which the end effector will be repositioned by movement of the arm;

(e) moving the arm automatically to reposition the end effector at the selected tube end according to a robot kinematics equation which quantitatively relates the tube sheet coordinate system to the robot coordinate system;

(f) determining whether the end effector as repositioned in step (e) is deviated from direct registry with the first target tube opening;

(g) if a deviation is determined in step (f), moving the arm differentially to move the end effector until the deviation is reduced within an acceptable tolerance;

(h) measuring the differential movement of the end effector in step (g);

(i) selecting the coordinate of a second target tube opening in the same calibration zone as the first target tube opening;

(j) moving the arm automatically to reposition the end effector at the second selected tube opening according to a recalibrated robot kinematics equation which quantitatively relates the tube sheet coordinate system to the robot coordinate system as further offset by the differential movement measured in step (h).

5. The method of claim 4, wherein steps (e) through (j) are repeated in each of a plurality of calibration zones.

6. The method of claim 4, wherein the tube sheet coordinate system has an origin O and is orthogonal along axes X, Y;

the robot coordinate system is orthogonal along axes X', Y', which are centered at original O' located at tube sheet coordinates $(X_o, y_o)$, the kinematics equations of step (e) are $$x_t = x_o + L_1\cos(A_1) + L_2\cos(A_2) + L_3\cos(A_3)$$

$$y_t = y_o + L_1\sin(A_1) + L_2\sin(A_2) + L_3\sin(A_3)$$

the recalibrated kinematics equations of step (j) are $$x_c = x_t + \Delta x_m$$

$$y_c = y_t + \Delta y_m$$

L1, L2, L3, are the respective lengths of a robot arm having three links which make respective angles A1, A2, A3;

$x_t$, $y_t$ are the coordinates of the target opening in the tube sheet system before calibration;

$x_c$, $y_c$ are the coordinates of the target opening in the tube sheet system after calibration; and $\Delta x_m$, $\Delta y_m$ are the differentials measured in step (h).

7. The method of claim 4, wherein the step (g) is performed by manually jogging a control device located outside the steam generator.

8. The method of claim 4, wherein the step (f) of determining the deviation, is performed at least in part by a multisensory system carried by the end effector.

9. The method of claim 8, wherein step (f) includes measuring one of force or torque imposed on the end effector resulting from actuating the entry of the tool into an opening.

10. The method of claim 4, wherein the calibration is performed at one opening in a first zone, the robot moves the tool according to the recalibrated kinematics equations for registry with and servicing of a plurality of other tube openings in said first zone, without recalibration, and the robot moves the tool to a second zone and is recalibrated at a second opening, in said second zone, and the robot moves the tool according to the recalibrated kinematics equations for registry with and servicing of a plurality of other tube openings in said second zone, without recalibration.

11. The method of claim 6, wherein the calibration is performed at one opening in a first zone, the robot moves the tool according to the recalibrated kinematics equations for registry with and servicing of a plurality of other tube openings in said first zone, without recalibration, and the robot moves the tool to a second zone and is recalibrated at a second opening, in said second zone, and the robot moves the tool according to the recalibrated kinematics equations for registry with and servicing of a plurality of other tube openings in said second zone, without recalibration.

12. The method of claim 4, wherein the first target tube opening is a reference opening which has visually observable indicia thereat, uniquely identifying the position coordinates of the reference opening.

13. The method of claim 6, wherein the first target tube opening is a reference opening which has visually observable indicia thereat, uniquely identifying the position coordinates of the reference opening.

* * * * *